United States Patent Office 3,455,745
Patented July 15, 1969

3,455,745
COATING OF OBJECTS WITH TETRABORON SILICIDE
Edward L. Kern, Midland, and George A. Jerome, Hemlock, Mich., assignors to Dow Corning Corporation, Midland, Mich., a corporation of Michigan
No Drawing. Filed July 8, 1966, Ser. No. 563,672
Int. Cl. C23c *13/02*
U.S. Cl. 148—6.3                 6 Claims

ABSTRACT OF THE DISCLOSURE

Method of forming tetraboron silicide on boron and silicon objects by heating the objects to a temperature between 1000° and 1200° C. in an atmosphere of either a gaseous boron material chosen from the group consisting of boron trichloride and a boron hydride together with hydrogen, or a silicon-containing gaseous material having the general formula $SiX_4$ in a hydrogen carrier where each X is chlorine, bromine, hydrogen or a methyl or ethyl group.

---

The present invention relates to the manufacture of tetraboron silicide ($B_4Si$), and more particularly to the coating of boron and silicon objects, or objects having coatings of boron or silicon, with tetraboron silicide.

Tetraboron silicide has been found to be highly resistant to oxidation and in general is chemically inert with respect to metals. Hence, it is useful as a protective coating. It has also been found to be useful in promoting bonding to fibers in fiber reinforced composite materials.

While tetraboron silicide has been known heretofore in powder form, difficulties have been encountered in attempting to provide homogeneous coatings of this material.

It is therefore an object of the present invention to provide tetraboron silicide in homogeneous form.

A further object is the provision of a method for forming in situ continuous homogeneous coatings of tetraboron silicide and the provision of objects having homogeneous coatings of tetraboron silicide on surfaces thereof.

In accordance with these and other objects there is provided by the present invention a method whereby tetraboron silicide may be formed on silicon objects by reacting a gaseous boron compound with the silicon and whereby tetraboron silicide may be formed on boron objects by reacting a gaseous silicon compound with the boron. In both cases the surfaces of the objects can be converted to homogeneous tetraboron silicide and objects having thin cross sections can be completely converted to tetraboron silicide; additionally, objects made of other materials may be coated with boron or silicon and the coating converted to tetraboron silicide.

Other objects and attendant advantages of the invention will become obvious to those skilled in the art from a consideration of the following detailed description and working examples of the invention.

In accordance with the invention a solid body of silicon or boron, which may, for example, be in the form of a rod or fiber is placed in a reaction chamber which is preferably closed to the atmosphere to prevent introduction of undesirable ambient contaminants. In the case where the body is silicon, a gaseous mixture of hydrogen with boron trichloride ($BCl_3$) or diborane ($B_2H_6$) is fed into the reaction chamber. Other boron hydrides including penta-, tetra-, and decaborane are also operable, although diborane is a preferred material. The body in the reaction chamber is heated to between 1000° C. and 1200° C. causing the boron compound to react with the silicon object forming tetraboron silicide which remains in place on the object and is bonded thereto. The ratio of hydrogen to the boron compound is apparently not critical since even minute amounts of the boron compound in the hydrogen flow will cause conversion of the silicon surface to tetraboron silicide. However, the process under such conditions becomes inefficient because the large excess of hydrogen carries away heat from the silicon body thus requiring greater amounts of heating power. A hydrogen-boron trichloride or hydrogen-diborane ratio of about 1 to 15 by volume at equal pressures has been found preferable. The reaction goes well at atmospheric pressure. It has been found that below about 1000° C. no tetraboron silicide is formed and above about 1200° C. the silicide becomes flaky or fluffy and fails to adhere well to the body being coated.

In the event that a boron object such as a boron filament is to be coated with tetraboron silicide it has been found that, under like conditions to those set forth above with respect to coating a silicon object, the surface of the boron object may easily be converted to boron tetrasilicide using silane ($SiH_4$) or a halogen and/or lower alkyl substituted silane or disilane. Trichlorosilane is a preferred material, but other silanes known to be suitable for the production of silicon may also be similarly used. These in general include compounds of the general formula $SiX_4$, where each X may be hydrogen, chlorine, bromine, or a methyl or ethyl group. These materials are preferably carried into the reaction chamber in a hydrogen stream formed by bubbling hydrogen through the silane. The hydrogen carries with it sufficient amounts of the halogenated silane to carry out the reaction with the boron surface.

In the case of both the boron and the silicon bodies, the entire body may be converted to tetraboron silicide if the body has a relatively small cross-section. For example, hyperpure silicon rods having a diameter of ⅛ inch have been converted to tetraboron silicide in about 20 minutes.

In the event that it is desired to coat objects of materials other than boron or silicon with a surface layer of tetraboron silicide, this can also be accomplished in accordance with the invention. This is preferably done by first coating the object to be coated with a layer of silicon or boron to a thickness at least as great as the tetraboron silicide coating desired. This may be accomplished as is known in the art by pyrolytic decomposition of boron or silicon compounds or by any other suitable method. The choice between boron and silicon coatings is determined by choosing the substance having the closest coefficient of thermal expansion to that of the object itself, in order to provide a strongly adherent coating. The coating of boron or silicon is then converted to tetraboron silicide by the process set forth above relative to solid bodies of silicon or boron.

If desired, the object to be coated can be heated to temperatures above about 500° C. and coated by simultaneous decomposition of the aforementiond boron and silicon reactants.

Example 1

A polycrystalline rod of pure silicon having a diameter of ⅛ inch was placed in a reaction chamber and heated to 1075° C. A mixture of 1.5 liters per minute of $BCl_3$ and 100 cc. per minute of $H_2$ at equal pressures was flowed through the reaction chamber for 10 minutes. The chamber was maintained at atmospheric pressure. The rod was then cooled and upon examination by X-ray diffraction was to have a surface consisting of tetraboron silicide.

Example 2

The surface of a ⅛ inch diameter silicon rod was converted to tetraboron silicide using $B_2H_6$ instead of $BCl_3$ under the same conditions as those of Example 1.

Example 3

A 3 mil boron fiber was placed in a reaction chamber and heated to 900° C. HCl was flowed through the chamber for one minute to clean the surface of the fiber. The temperature was then raised to 1050° C. and hydrogen which had been bubbled through $SiHCl_3$ was flowed into the chamber for 1 minute, the chamber being maintained at atmospheric pressure. The fiber was then cooled and by X-ray diffraction was found to have a homogeneous surface coating of tetraboron silicide.

Example 4

A graphite rod was placed in a reaction chamber and coated with silicon by hydrogen reduction of trichlorosilane at 1150° C. The silicon coating was then converted to tetraboron silicide using the technique of Example 1.

That which is claimed is:

1. A method of forming tetraboron silicide comprising:
   placing within a reaction chamber materials chosen from the group consisting of:
   (A) silicon gaseous material chosen from the group consisting of (1) boron trichloride and hydrogen and (2) a boron hydride and hydrogen, and
   (B) boron and gaseous material chosen from the group of compounds having the general formula $SiX_4$ in a hydrogen carrier, where each X is chlorine, bromine, hydrogen, or a methyl or ethyl group, and heating said materials in said reaction chamber to a temperature between 1000° C. and 1200° C.

2. A method as defined in claim 1 wherein said member chosen from the group consisting of silicon and boron is in the form of a layer on a body of another material.

3. A method as defined in claim 1 wherein said materials are silicon in solid form and gaseous material chosen from the group consisting of (1) boron trichloride and hydrogen, and (2) diborane and hydrogen and wherein said gaseous material is continuously flowed through said reaction chamber.

4. A method as defined in claim 3 wherein said silicon is in the form of a coating upon a body of another material.

5. A method as defined in claim 1 where said materials are boron in solid form and gaseous material chosen from the group of compounds having the general formula $SiX_4$, where each X is hydrogen, chlorine, bromine, or a methyl or ethyl group and wherein said gaseous material is continuously flowed through and reaction chamber in a stream of hydrogen.

6. A method as defined in claim 5 wherein said boron is in the form of a coating upon a body of another material.

References Cited

UNITED STATES PATENTS

| | | |
|---|---|---|
| 2,823,151 | 2/1958 | Yntema et al. |
| 3,090,702 | 1/1963 | Commanday et al. __ 117—106 |
| 3,138,468 | 6/1964 | Matkovich et al. ____ 23—204 X |
| 3,160,521 | 12/1964 | Ziegler et al. _____ 178—175 X |
| 3,162,526 | 12/1964 | Vanik _____ 148—174 X |

OTHER REFERENCES

Powell et al.: Vapor Plating, 1955, pp. 106 and 107 relied upon.

Miller et al.: Journal of the Electrochemical Society, vol. 8–110, December 1963, pp. 1250 to 1256 relied upon.

ALFRED L. LEAVITT, Primary Examnier

A. GOLIAN, Assistant Examiner

U.S. Cl. X.R.

23—204; 117—69, 106, 118

U.S. PATENT OFFICE
UNITED STATES PATENT OFFICE
CERTIFICATE OF CORRECTION

Patent No. 3,455,745                Dated: July 15, 1969

Edward L. Kern and George A. Jerome

It is certified that errors appear in the above-identified pate and that said Letters Patent are hereby corrected as shown below:

Col. 3, line 22, the word --and-- should appear between silicon gase

Col. 4, line 12, the word "and" should read --said-- appearing after word through.

SIGNED AND
SEALED
JAN 20 1970

(SEAL)
Attest:

Edward M. Fletcher, Jr.
Attesting Officer

WILLIAM E. SCHUYLER, JR.
Commissioner of Patents